United States Patent
Yokota (10) Patent No.: US 8,057,059 B2
(45) Date of Patent: Nov. 15, 2011

(54) LIGHTING DEVICE AND DISPLAY DEVICE

(75) Inventor: Masashi Yokota, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 4 days.

(21) Appl. No.: 12/863,470

(22) PCT Filed: Nov. 19, 2008

(86) PCT No.: PCT/JP2008/070989
§ 371 (c)(1),
(2), (4) Date: Jul. 19, 2010

(87) PCT Pub. No.: WO2009/110138
PCT Pub. Date: Sep. 11, 2009

(65) Prior Publication Data
US 2010/0284172 A1    Nov. 11, 2010

(30) Foreign Application Priority Data
Mar. 6, 2008   (JP) ................. 2008-055961

(51) Int. Cl.
*F21V 33/00* (2006.01)
(52) U.S. Cl. .............. 362/97.4; 362/364; 362/306
(58) Field of Classification Search .............. 362/97.4, 362/225, 634, 632, 306, 311.01, 260
See application file for complete search history.

(56) References Cited

U.S. PATENT DOCUMENTS

| | | | |
|---|---|---|---|
| 6,902,300 B2* | 6/2005 | Lee | 362/306 |
| 7,367,708 B2* | 5/2008 | Hsieh | 362/634 |
| 7,604,390 B2* | 10/2009 | Zhang et al. | 362/634 |
| 2006/0104080 A1* | 5/2006 | Kim et al. | 362/555 |
| 2007/0047225 A1* | 3/2007 | Sudo | 362/225 |

FOREIGN PATENT DOCUMENTS

| | | |
|---|---|---|
| JP | 2005-108776 A | 4/2005 |
| JP | 2005-316337 A | 11/2005 |
| JP | 2007-157451 A | 6/2007 |

OTHER PUBLICATIONS

Official Communication issued in International Patent Application No. PCT/JP2008/070989, mailed on Dec. 22, 2008.

* cited by examiner

*Primary Examiner* — Laura Tso
(74) *Attorney, Agent, or Firm* — Keating & Bennett, LLP (57) ABSTRACT

A lighting device having a reduced size. The lighting device has a support member (9) installed on an installation section (4c) of a backlight chassis (4), a power source substrate (6) placed behind the backlight chassis (4), and an insulation sheet (7) bonded to a bottom section (4a) of the backlight chassis (4). The installation section (4c) does not project rearward from the bottom section (4a) but projects forward. The support member (9) is installed so as not to project rearward from the bonding surface between the bottom section (4a) and the insulation sheet (7).

10 Claims, 8 Drawing Sheets

LIGHTING DEVICE AND DISPLAY DEVICE

TECHNICAL FIELD

The present invention relates to a lighting device and a display device.

BACKGROUND ART

Lighting devices using a fluorescent tube as a light source have conventionally been known, and such lighting devices are used as backlight units for display devices such as liquid crystal display devices (see, for example, Patent Document 1).

Figure 13:
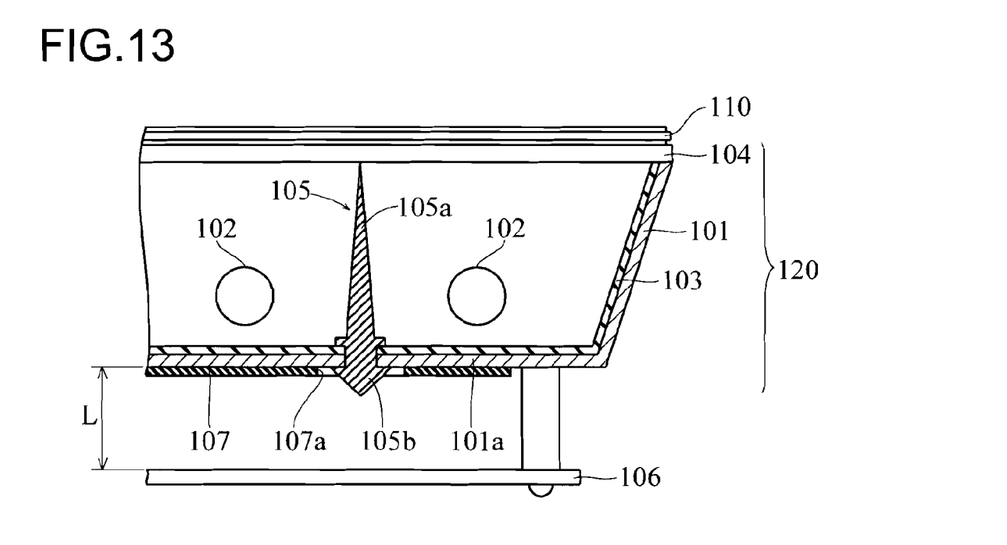
FIG. 13 is a diagram schematically showing an example of the structure of a conventional liquid crystal display device.

FIG. 13 is a diagram schematically showing an example of the structure of a conventional liquid crystal display device. A description will be given below of the structure of a conventional liquid crystal display device with reference to FIG. 13.

In the conventional liquid crystal display device, as shown in FIG. 13, a backlight unit 120 is placed at the rear surface side of a liquid crystal display panel 110. And the conventional liquid crystal display device is structured such that images are displayed on the display surface (the front surface) of the liquid crystal display panel 110 by irradiating the rear surface of the liquid crystal display panel 110 with light emitted from the backlight unit 120.

The backlight unit 120 is at least provided with a metal backlight chassis 101, fluorescent tubes 102 housed in the backlight chassis 101, a reflection sheet 103 reflecting light from the fluorescent tubes 102, and an optical sheet 104 that, for example, diffuses light from the fluorescent tubes 102. The reflection sheet 103 is disposed along the housing-area-side surface of the backlight chassis 101, and the optical sheet 104 is disposed so as to cover the housing area of the backlight chassis 101 from the front side. The optical sheet 104 is also supported by a support member 105 installed on a bottom section 101a of the backlight chassis 101.

The support member 105 includes a support prop 105a for supporting the optical sheet 104 and an engagement piece 105b that engages with the bottom section 101a of the backlight chassis 101. And, the support member 105 is installed on the bottom section 101a of the backlight chassis 101 by engaging the engagement piece 105b of the support member 105 with the bottom section 101a of the backlight chassis 101. Incidentally, in the state in which the support section 105 is installed on the bottom section 101a of the backlight chassis 101, the engagement piece 105b of the support member 105 projects rearward from the bottom section 101a of the backlight chassis 101.

In the backlight unit 120 as described above, a power supply substrate 106 is typically placed behind the backlight chassis 101 for supplying power to the fluorescent tubes 102. In this case, for electrically insulating the backlight chassis 101 and the power supply substrate 106 from each other, an insulation sheet 107 is disposed between the backlight chassis 101 and the power supply substrate 106, and also, the insulation sheet 107 is bonded to the bottom section 101a of the backlight chassis 101.

Patent Document 1: JP-A-2007-157451

DISCLOSURE OF THE INVENTION

Problems to be Solved by the Invention

With the conventional structure as described above, if the support member 105 is disposed in an area that needs to be electrically insulated by the insulation sheet 107, an opening section 107a needs to be formed in the insulation sheet 107 to let the support member 105 (the engagement piece 105b) escape therethrough, the support member 105 projecting rearward from the bonding surface between the bottom section 101a of the backlight chassis 101 and the insulation sheet 107. This results in a state in which, in the area that needs to be electrically insulated by the insulation sheet 107, the bottom section 101a of the backlight chassis 101 is partly exposed to the rear side through the opening section 107a that is formed in the insulation sheet 107 to let the support member 105 (the engagement piece 105b) escape therethrough. In this case, the distance L between the bottom section 101a of the backlight chassis 101 and the power supply substrate 106 needs to be maintained to a distance required by the safety standard, which is inconvenient. As a result, it becomes disadvantageously difficult to shorten the distance L between the bottom section 101a of the backlight chassis 101 and the power supply substrate 106, and the size of the device is inconveniently increased.

Figure 14:
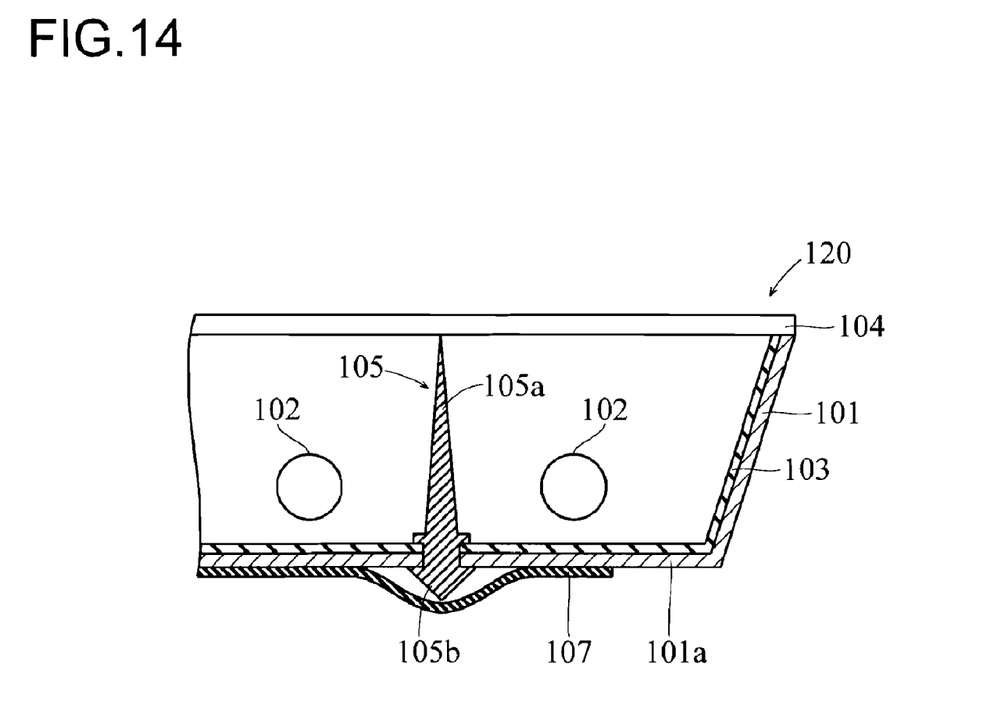
FIG. 14 is a diagram for illustrating a conventionally experienced problem.

Incidentally, in order to dispose the support member 105 in the area that needs to be electrically insulated by the insulation sheet 107 without forming the opening section 107a in the insulation sheet 107 for letting the support member 105 escape therethrough, the insulation sheet 107 needs to be partly bent corresponding to the support member 105 (the engagement piece 105b) as shown in FIG. 14. This inconveniently deteriorates the workability of bonding the insulation sheet 107 to the bottom section 101a of the backlight chassis 101. In addition, if the insulation sheet 107 is partly bent corresponding to the support member 105 (the engagement piece 105b), the insulation sheet 107 tends to come off from the bottom section 101a of the backlight chassis 101, disadvantageously deteriorating the long-term reliability.

The present invention has been made to solve the above problems, and an object of the present invention is to provide a lighting device and a display device that allows product miniaturization.

Means for Solving the Problem

To achieve the above object, according to a first aspect of the present invention, a lighting device is provided with: a metal chassis having a bottom section and a side section, the chassis housing a fluorescent tube in an area surrounded by the bottom section and the side section; an optical sheet that is disposed at a front side of the chassis and at least diffuses light from the fluorescent tube; a support member that supports the optical sheet and is installed on an installation section formed at a predetermined portion of the bottom section of the chassis; a power supply substrate that is disposed at a rear side of the chassis and supplies power to the fluorescent tube, the rear side of the chassis being opposite to the front side of the chassis; and an insulation sheet that is disposed between the chassis and the power supply substrate and bonded to the bottom section of the chassis for electrically insulating the chassis and the power supply substrate from each other. Here, the installation section of the chassis is disposed in an area that needs to be electrically insulated by the insulation sheet, the installation section projecting not rearward but frontward from the bottom section of the chassis, and the support member is installed on the installation section of the chassis so as not to project rearward from a bonding surface between the bottom section of the chassis and the insulation sheet.

According to the lighting device of the first aspect, by making the installation section formed at the predetermined portion of the bottom section of the chassis project not rearward but frontward from the bottom section of the chassis as described above, it is possible to install the support member on the installation section of the chassis so as not to project rearward from the bonding surface between the bottom section of the chassis and the insulation sheet. This eliminates the need of forming an opening section in the insulation sheet for letting the support member escape therethrough when the support member (the installation section of the chassis) is disposed in the area that needs to be electrically insulated by the insulation sheet. Thus, in the area that needs to be electrically insulated by the insulation sheet, the insulation sheet can be bonded to the bottom section of the chassis such that the bottom section of the chassis is not exposed to the rear side. This eliminates the need of setting the distance between the bottom section of the chassis and the power supply substrate according to the regulation of the safety standard, and thus the distance can be reduced. This contributes to reduction of the device size.

Furthermore, since the support member does not project rearward from the bonding surface between the bottom section of the chassis and the insulation sheet in a state in which the support member is installed on the installation section of the chassis, it is possible to bond the insulation sheet to the bottom section of the chassis without bending the insulation sheet. This makes it possible to prevent disadvantages such as deterioration of workability in bonding the insulation sheet to the bottom section of the chassis, and degradation of long-term reliability resulting from increased tendency of the insulation sheet to come off from the bottom section of the chassis.

In the lighting device of the first aspect of the present invention, it is preferable that the installation section of the chassis is formed of a projecting section obtained by applying drawing processing to the predetermined portion of the bottom section of the chassis. This structure makes it easy to make the installation section formed at the predetermined portion of the bottom section of the chassis project not rearward but frontward from the bottom section.

In the above case, it is preferable that the support member has formed therein a recessed section into which the projecting section of the chassis is fitted. With this structure, by fitting the installation section (the projecting section) of the chassis into the recessed section of the support member, it is easy to install the support member on the installation section (the projecting section) of the chassis such that the support member doe not project rearward from the bonding surface between the bottom section of the chassis and the insulation sheet. In this case, however, the housing-area-side surface of the installation section (the projecting section) of the chassis is covered with the support member. Thus, by using a support member formed of a resin containing a light-reflecting material, it is possible to improve the utilization efficiency of light without applying a light-reflecting material or the like to the housing-area side surface of the installation section (the projecting section) of the chassis.

In the above case, it is preferable that an installation hole is formed in the projecting section of the chassis, and that the support member has formed therein an engagement section that is engaged in the installation hole of the chassis. With this structure, by engaging the engagement section of the support member in the installation hole of the chassis, it is easy to install the support member on the installation section (the projecting section) of the chassis such that the support member does not project rearward from the bonding surface between the bottom section of the chassis and the insulation sheet. In this case, since the support member is securely installed on the installation section (the projecting section) of the chassis, it is possible to prevent the support member from falling off from the installation section (the projecting section) of the chassis.

In the lighting device of the first aspect of the present invention, it is preferable that the installation section of the chassis is formed with a pin projecting from the predetermined portion of the bottom section of the chassis, and that the support member is installed on the installation section of the chassis by forcing the pin of the chassis into the support member. With this structure, it is possible to make the installation section of the chassis project not to rearward but frontward from the bottom section of the chassis without applying drawing processing to the predetermined portion of the bottom section of the chassis to form the installation section. This makes it possible to reduce the space taken up by the installation section of the chassis.

According to a second aspect of the present invention, a display device is provided with the lighting device of the first aspect of the present invention described above and a display panel irradiated with light emitted from the lighting device. With this structure, it is easy to achieve miniaturization of display devices.

Advantages of the Invention

As described hereinabove, according to the present invention, it is easy to obtain a lighting device and a display device with which device miniaturization can be achieved.

LIST OF REFERENCE SYMBOLS 1 backlight unit (lighting device)
2 liquid crystal display panel (display panel)
3 fluorescent tube
4 backlight chassis (chassis)
4a bottom section
4b side section
4c installation section
4d, 4e, 4f installation hole
4g pin
6 power supply substrate
7 insulation sheet
8 optical sheet
9, 29, 39, 49, 59, 69 support member
9b, 29b, 39b, 49b, 59b cup section (recessed section)
9c, 29c, 39c, 59c engagement pin (engagement section)
49c male screw section (engagement section)

BEST MODE FOR CARRYING OUT THE INVENTION

First Embodiment

First, with reference to FIGS. 1 and 2, descriptions will be given of a backlight unit according to a first embodiment and a liquid crystal display device provided with the backlight unit.

Figure 1:
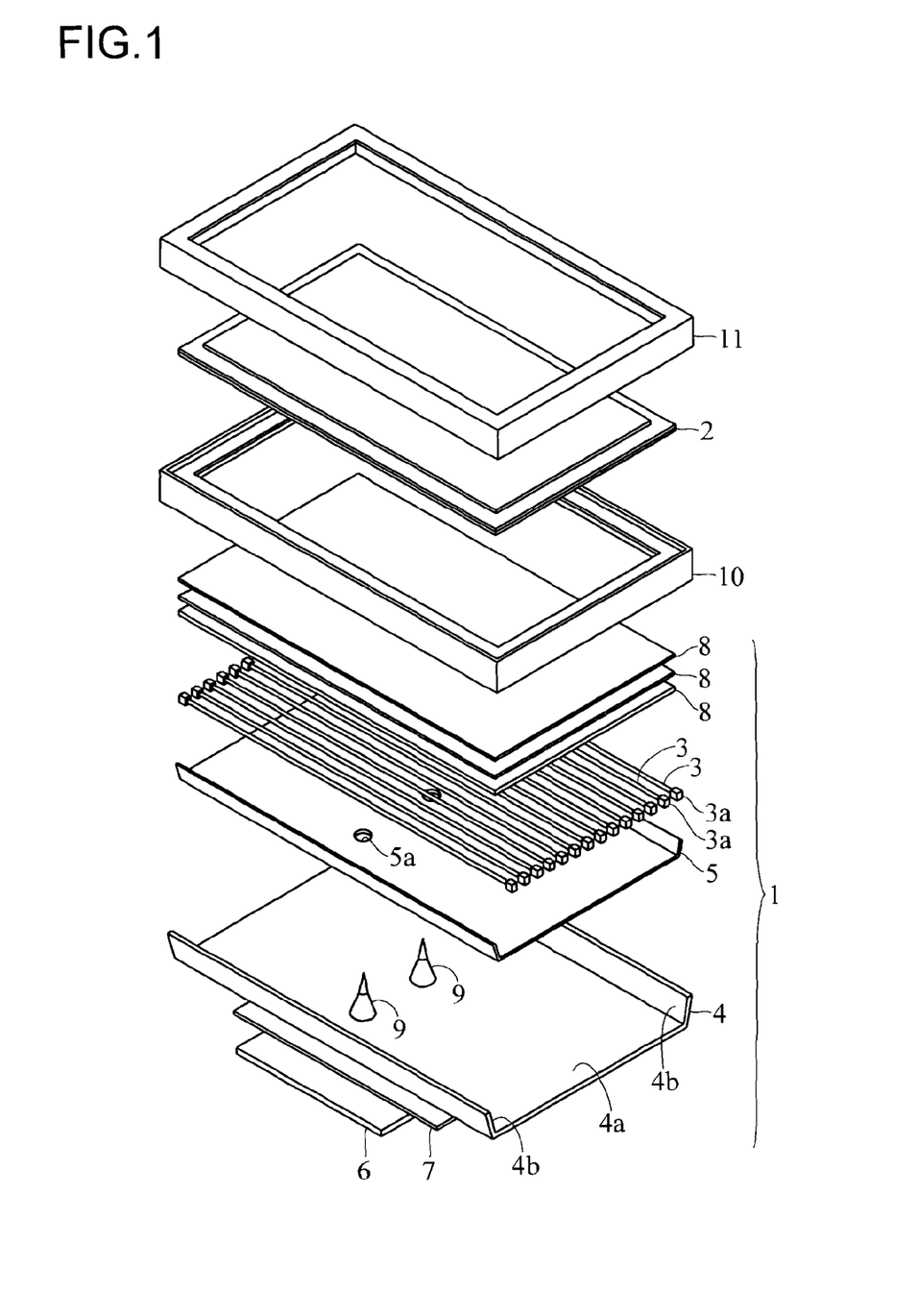
FIG. 1 is an exploded perspective view of a liquid crystal display device provided with a backlight unit according to a first embodiment of the present invention.

In the liquid crystal display device (as a display device) according to the first embodiment, as shown in FIG. 1, a backlight unit 1 is disposed behind a liquid crystal display panel 2. And the liquid crystal display device is structured such that an image is displayed on the display surface (the front surface) of the liquid crystal display panel 2 by irradiating the rear surface of the liquid crystal display panel 2 with light (surface light) emitted from the backlight unit 1. The backlight unit 1 is an example of the "lighting device" of the present invention, and the liquid crystal display panel 2 is an example of the "display panel" of the present invention. A detailed description will be given below of the structure of the backlight unit 1 according to the first embodiment.

Figure 2:
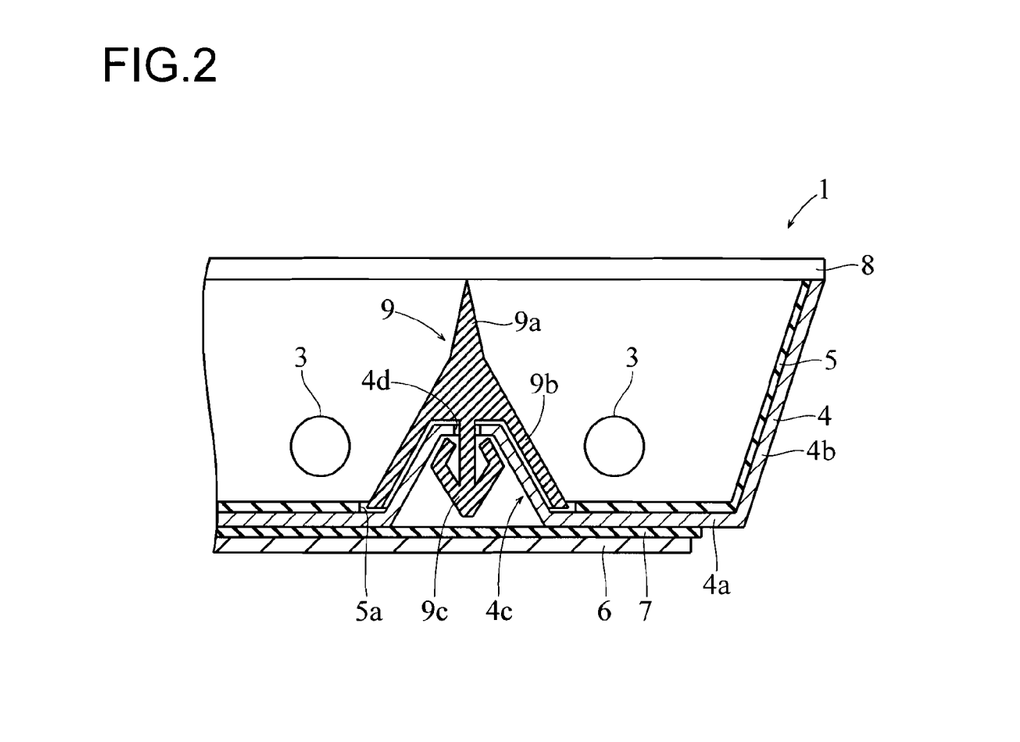
FIG. 2 is a sectional view of the backlight unit according to the first embodiment of the present invention (a sectional view showing a vicinity of a support member supporting an optical sheet)

The backlight unit 1 of the first embodiment is a direct backlight unit as shown in FIGS. 1 and 2, and is structured such that a light source is placed directly under the liquid crystal display panel 2. The light source of the backlight unit 1 is formed with a plurality of elongate fluorescent tubes 3 arranged parallel to each other, and is housed in a housing area of a backlight chassis 4. Holders 3a engaged with the backlight chassis 4 are installed one at each end of each of the fluorescent tubes 3. The fluorescent tubes 3 are fixed to the backlight chassis 4 by the holders 3a being engaged with the backlight chassis 4.

The backlight chassis 4 is made of a metal plate bent in substantially a recessed shape. That is, the backlight chassis 4 has a bottom section 4a, a pair of side sections 4b standing from two ends of the bottom section 4a. An area surrounded by the bottom section 4a and the side sections 4b of the backlight chassis 4 is the housing area in which the fluorescent tubes 3 are housed. The backlight chassis 4 is an example of the "chassis" of the present invention.

Furthermore, in the housing area of the backlight chassis 4, a reflection sheet 5 made of a resin sheet is provided. The reflection sheet 5 reflects light from the fluorescent tubes 3 frontward, and placed along the housing-area-side surfaces of the bottom section 4a and the side sections 4b of the backlight chassis 4.

Behind the backlight chassis 4, there are arranged a power supply substrate 6 for supplying electric power to the fluorescent tubes 3, an inverter substrate (not illustrated), and the like, which are screw-fixed to the bottom section 4a of the backlight chassis 4. Moreover, an insulation sheet 7 made of a resin sheet is placed between the backlight chassis 4 and the power supply substrate 6. The insulation sheet 7 is provided for electrically insulating the backlight chassis 4 and the power supply substrate 6 from each other, and bonded to the bottom section 4a of the backlight chassis 4.

An optical sheet 8 is placed in front of the backlight chassis 4 so as to cover the housing area of the backlight chassis 4 from the front side (so as to cover the fluorescent tubes 3 from the front side), the optical sheet 8 diffusing/collecting light from the fluorescent tubes 3. The optical sheet 8 is supported by a support member 9 installed on a predetermined portion (hereinafter, installation section 4c) of the bottom section 4a of the backlight chassis 4. The optical sheet 8 includes a diffusion sheet, a lens sheet, and the like.

Here, in the first embodiment, as shown in FIG. 2, the installation section 4c of the backlight chassis 4 is formed to project not rearward but forward (to the housing-area side of the backlight chassis 4) from the bottom section 4a of the backlight chassis 4. And, the support member 9 is installed on the installation section 4c of the backlight chassis 4 so as not to project rearward from the bonding surface between the bottom section 4a of the backlight chassis 4 and the insulation sheet 7. At a predetermined portion of the reflection sheet 5, an opening section 5a is formed to let the installation section 4c of the backlight chassis 4 escape therethrough.

Specifically, the installation section 4c of the backlight chassis 4 is formed of a projecting section obtained by applying drawing processing to a predetermined portion of the bottom section 4a of the backlight chassis 4. That is, the installation section (the projecting section) 4c of the backlight chassis 4 has a shape of a circular truncated cone having a hollow space inside. Furthermore, in the top portion of the installation section (the projecting section) 4c of the backlight chassis 4, there is formed an installation hole 4d through which a metal plate is inserted.

The support member 9 includes a circular-cone shaped support prop 9a, for supporting the optical sheet 8, a cup section 9b formed in a recessed shape having an opening that is open to the opposite side from the end of the support prop 9a, and an engagement pin 9c formed to project into the inside of the cup section 9b, which are integrally formed as a single unit. The support prop 9a of the support member 9 supports the optical sheet 8 at an end thereof. The installation section (the projecting section) 4c of the backlight chassis 4 can be fitted into the cup section 9b of the support member 9. The engagement pin 9c of the support member 9 has a plurality of elastically deformable engagement pieces diverging from the end of the engagement pin 9c, and the engagement pin 9c can be engaged in the installation hole 4d of the backlight chassis 4. The cup section 9b is an example of the "recessed section"

of the present invention, and the engagement pin 9c is an example of the "engagement section" of the present invention.

And, according to the first embodiment, the support member 9 is installed on the installation section (the projecting section) 4c of the backlight chassis 4 by fitting the installation section (the projecting section) 4c of the backlight chassis 4 into the cup section 9b of the support member 9 and engaging the engagement pin (the engagement piece) 9c of the support member 9 in the installation hole 4d of the backlight chassis 4. In engaging the engagement pin (the engagement piece) 9c of the support member 9 in the installation hole 4d of the backlight chassis 4, when the installation section (the projecting section) 4c of the backlight chassis 4 is fitted into the cup section 9b of the support member 9, the engagement pin (the engagement piece) 9c of the support member 9 is elastically deformed to be inserted through the installation hole 4d into the installation section (the projecting section) 4c of the backlight chassis 4. This results in the state shown in FIG. 2.

According to the above structure, when the support member 9 is installed on the installation section (the projecting section) 4c of the backlight chassis 4, the engagement pin (the engagement piece) 9c of the support member 9 is housed inside the installation section (the projecting section) 4c of the backlight chassis 4, and thus the engagement pin (the engagement piece) 9c of the support member 9 does not project rearward from the bonding surface between the bottom section 4a of the backlight chassis 4 and the insulation sheet 7. This eliminates the need of forming an opening section in the insulation sheet 7 for letting the engagement pin (the engagement piece) 9c of the support member 9 to escape therethrough when the support member 9 (the installation section (the projecting section) 4c of the backlight chassis 4) is disposed in the area that needs to be electrically insulated by the insulation sheet 7.

According to the first embodiment, the support member 9 is made of a highly light reflecting polycarbonate resin (a polycarbonate resin containing a light reflecting material such as titanium oxide). Thus, when the support member 9 is installed on the installation section (the projecting section) 4c of the backlight chassis 4 (that is, when the installation section (the projecting section) 4c of the backlight chassis 4 is fitted into the cup section 9b of the support member 9), the housing-area-side surface of the installation section (the projecting section) 4c of the backlight chassis 4 which is not covered by the reflection sheet 5 is covered by the highly light reflecting polycarbonate resin.

The backlight unit 1 of the first embodiment is structured as described above.

Also, as shown in FIG. 1, a picture-frame-shaped frame 10 is placed between the backlight unit 1 and the liquid crystal display panel 2. And the liquid crystal display panel 2 placed at the front side of the backlight unit 1 is supported by the frame 10. Also, at the front side of the liquid crystal display panel 2, there is placed a picture-frame-shaped bezel 11, and the circumference of the liquid crystal display panel 2 is sandwiched between the frame 10 and the bezel 11.

According to the first embodiment, as described above, by making the installation section 4c formed at a predetermined portion of the bottom section 4a of the backlight chassis 4 project not rearward but frontward from the bottom section 4a of the backlight chassis 4, it is possible to install the support member 9 on the installation section 4c of the backlight chassis 4 so as not to project rearward from the bonding surface between the bottom section 4a of the backlight chassis 4 and the insulation sheet 7. This eliminates the need of forming an opening section in the insulation sheet 7 for letting the support member 9 to escape therethrough when the support member 9 (the installation section 4c of the backlight chassis 4) is disposed in the area that needs to be electrically insulated by the insulation sheet 7. Thus, in the area that needs to be electrically insulated by the insulation sheet 7, the insulation sheet 7 can be bonded to the bottom section 4a of the backlight chassis 4 such that the bottom section 4a of the backlight chassis 4 is not exposed to the rear side. This eliminates the need of setting the distance between the bottom section 4a of the backlight chassis 4 and the power supply substrate 6 according to the regulation of the safety standard, and thus the distance can be reduced. This contributes to reduction of the device size.

According to the first embodiment, since the support member 9 does not project rearward from the bonding surface between the bottom section 4a of the backlight chassis 4 and the insulation sheet 7 in a state in which the support member 9 is installed on the installation section 4c of the backlight chassis 4, it is possible to bond the insulation sheet 7 to the bottom section 4a of the backlight chassis 4 without bending the insulation sheet 7. This makes it possible to prevent disadvantages such as deterioration of workability in bonding the insulation sheet 7 to the bottom section 4a of the backlight chassis 4 and degradation of long-term reliability resulting from increased tendency of the insulation sheet 7 to come off from the bottom section of the backlight chassis 4.

Also, according to the first embodiment, as described above, by applying drawing processing to the predetermined portion of the bottom section 4a of the backlight chassis 4 to use the projecting section obtained by the drawing processing as the installation section 4c, it is easy to make the installation section 4c formed at the predetermined portion of the bottom section 4a of the backlight chassis 4 project not rearward but frontward from the bottom section 4a.

Also, according to the first embodiment, as described above, by using a unit resulting from integrally forming the circular-cone shaped support prop 9a for supporting the optical sheet 8, the cup section 9b having a recessed shape having an opening that is open to the opposite side from the end of the support prop 9a, and the engagement pin 9c formed to project into the inside of the cup section 9b, and by fitting the installation section (the projecting section) 4c of the backlight chassis 4 into the cup section 9b of the support member 9 and engaging the engagement pin (the engagement piece) 9c of the support member 9 in the installation hole 4d of the backlight chassis 4, it is easy to install the support member 9c on the installation section 4c of the backlight chassis 4 such that the support member 9c does not project rearward from the bonding surface between the bottom section 4a of the backlight chassis 4 and the insulation sheet 7.

Also, according to the first embodiment, as described above, by using the support member 9 made of a highly light reflecting polycarbonate resin and fitting the installation section (the projecting section) 4c of the backlight chassis 4 into the cup section 9b of the support member 9, it is possible to achieve a state in which the housing-area-side surface of the installation section (the projecting section) 4c of the backlight chassis 4 that is not covered with the reflection sheet 5 is covered with the highly light reflecting polycarbonate resin. Thus, it is possible to improve the utilization efficiency of light without applying a light-reflecting material or the like to the housing-area side surface of the installation section (the projecting section) 4c of the backlight chassis 4.

Also, according to the first embodiment, as described above, the support member 9 is securely installed on the installation section (projecting section) 4c of the backlight chassis 4 by engaging the engagement pin (engagement piece) 9c of the support member 9 in the installation hole 4d of the backlight chassis 4. This helps prevent the support member 9 from falling off from the installation section (the projecting section) 4c of the backlight chassis 4.

Next, with reference to FIG. 3, a description will be given of the structure of a backlight unit according to a first modified example of the first embodiment.

Figure 3:
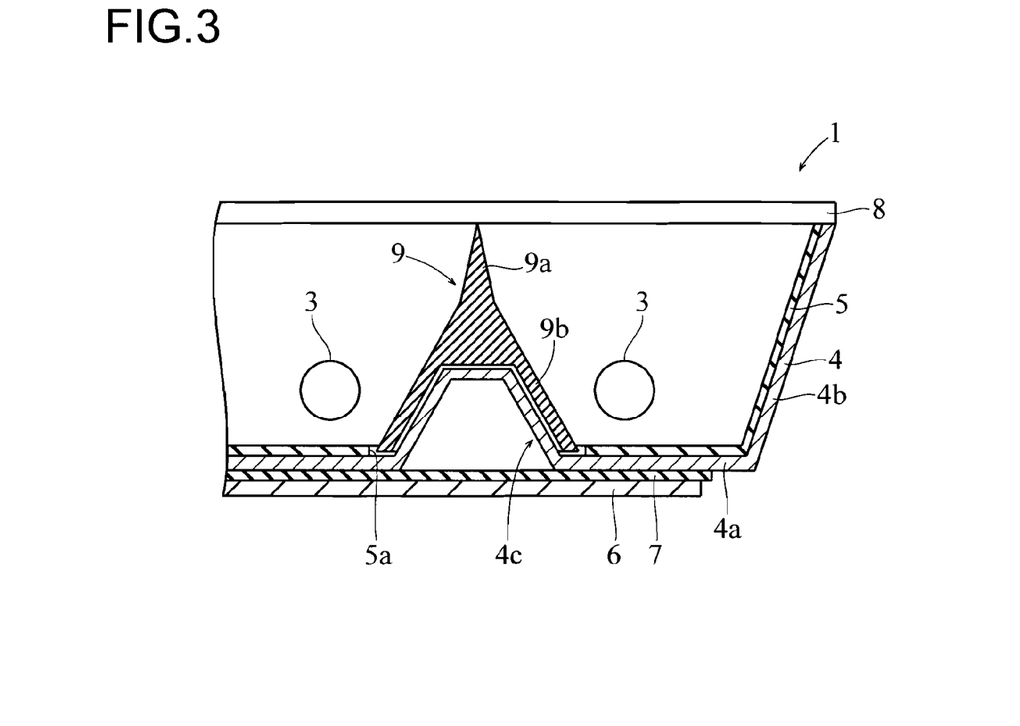
FIG. 3 is a sectional view of a backlight unit according to a first modified example of the first embodiment (a sectional view showing a vicinity of a support member supporting an optical sheet)

As shown in FIG. 3, a support member 9 of the first modified example of the first embodiment has a structure obtained by omitting the engagement pin (the engagement piece) 9c from the support member 9 of the first embodiment shown in FIG. 2. In this case, it is preferable that the housing-area-side surface of the installation section (the projecting section) 4c of the backlight chassis 4 and the inner surface of the cup section 9b of the support member 9 are bonded to each other via a double-stick tape (not shown) or the like.

The other features of the first modified example of the first embodiment are similar to those of the first embodiment described above.

Next, with reference to FIG. 4, a description will be given of the structure of a backlight unit according to a second modified example of the first embodiment.

Figure 4:
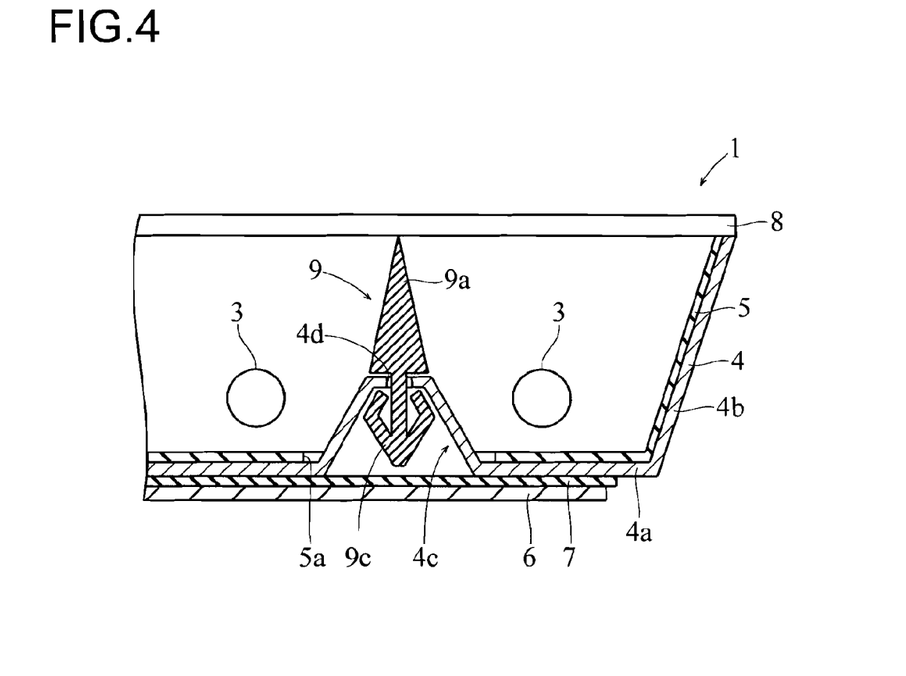
FIG. 4 is a sectional view of a backlight unit according to a second modified example of the first embodiment (a sectional view showing a vicinity of a support member supporting an optical sheet)

As shown in FIG. 4, a support member 9 of the second modified example of the first embodiment has a structure obtained by omitting the cup section 9b from the support member 9 of the first embodiment shown in FIG. 2. In this case, it is preferable that a light reflecting material is applied to the housing-area-side surface of the installation section (a projecting section) 4c of the backlight chassis 4.

The other features of the second modified example of the first embodiment are similar to those of the first embodiment described above.

Second Embodiment

Next, with reference to FIG. 5, a description will be given of the structure of a backlight unit according to a second embodiment.

Figure 5:
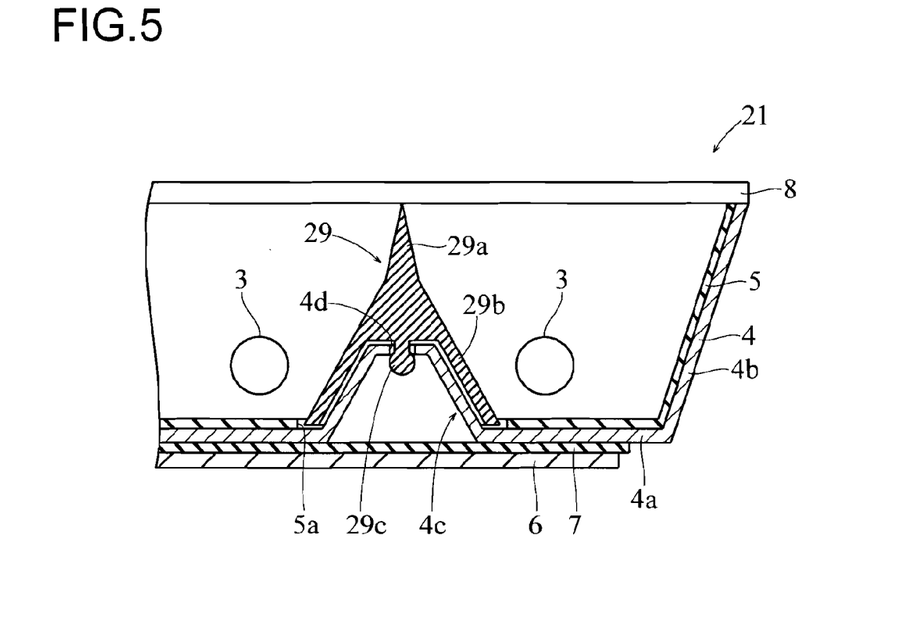
FIG. 5 is a sectional view of a backlight unit according to a second embodiment of the present invention (a sectional view showing a vicinity of a support member supporting an optical sheet)

In a backlight unit 21 according to the second embodiment, a support member 29 as shown in FIG. 5 is used. The support member 29 of the second embodiment is specifically structured such that it includes a circular-cone shaped support prop 29a for supporting the optical sheet 8, a cup section 29b formed in a recessed shape having an opening that is open to the opposite side from the end of the support prop 29a, and an engagement pin 29c formed to project into the inside of the cup section 29b, which are integrally formed as a single unit. The support prop 29a and the cup section 29b of the support member 29 of the second embodiment are similar to the support prop 9a and the cup section 9b, respectively, of the support member 9 of the first embodiment described above. On the other hand, the engagement pin 29c of the support member 29 of the second embodiment is different from the engagement pin 9c of the support member 9 of the first embodiment described above in that the engagement pin 29c has a substantially spherical engagement piece formed at an end thereof. The cup section 29b is an example of the "recessed section" of the present invention, and the engagement pin 29c is an example of the "engagement section" of the present invention.

The other features of the second embodiment are the same as those of the first embodiment described above.

According to the second embodiment, by using the support member 29 structured as described above, the engagement pin (the engagement piece) 29c of the support member 29 can be engaged in the installation hole 4d of the backlight chassis 4 with improved workability.

Also, according to the second embodiment, by using the support member 29 structured as described above, which has a simpler structure than the support member 9 of the first embodiment described above, it is possible to improve the easiness of production.

The other advantages of the second embodiment are similar to those of the first embodiment described above.

Third Embodiment

Next, with reference to FIGS. 6 to 8, a description will be given of the structure of a backlight unit according to the third embodiment.

Figure 6:
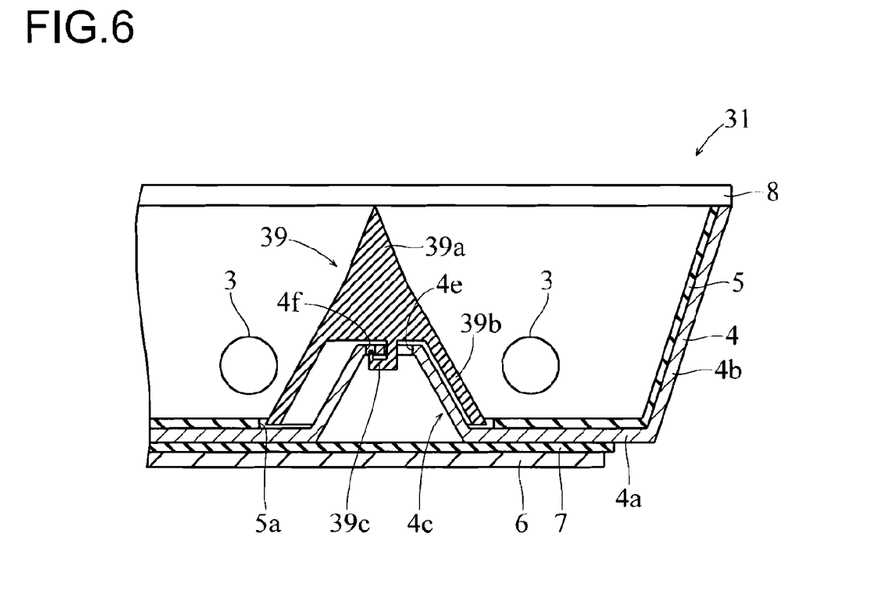
FIG. 6 is a sectional view of a backlight unit according to a third embodiment of the present invention (a sectional view showing a vicinity of a support member supporting an optical sheet)

In a backlight unit 31 according to the third embodiment, a support member 39 as shown in FIG. 6 is used. The support member 39 of the third embodiment is specifically structured such that it includes a circular-cone shaped support prop 39a for supporting the optical sheet 8, a cup section 39b formed in a recessed shape having an opening that is open to the opposite side from the end of the support prop 39a, and an engagement pin 39c formed to project into the inside of the cup section 39b, which are integrally formed as a single unit. The support prop 39a and the cup section 39b of the support member 39 of the third embodiment are similar to the support prop 9a and the cup section 9b, respectively, of the support member 9 of the first embodiment described above. However, the cup section 39b of the support member 9 of the third embodiment has a wider opening than the cup section 9b of the support member 9 of the first embodiment described above. On the other hand, the engagement pin 39c of the support member 39 of the third embodiment is different from the engagement pin 9c of the support member 9 of the first embodiment described above in that the engagement pin 39c is substantially L-shaped and has an engagement piece at its end. The cup section 39b is an example of the "recessed section" of the present invention, and the engagement pin 39c is an example of the "engagement section" of the present invention.

Figure 7:
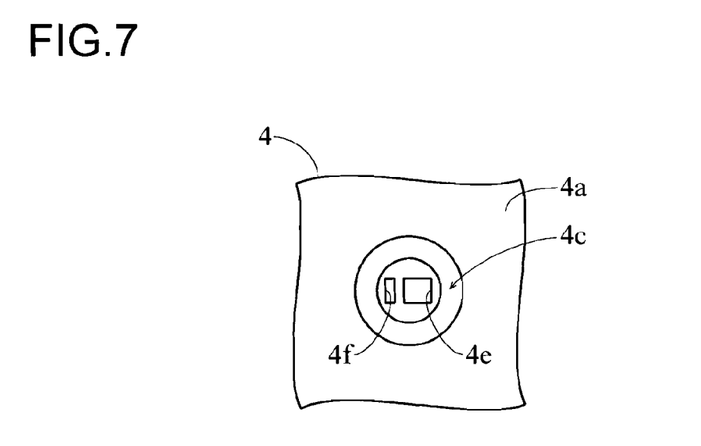
FIG. 7 is a plan view showing an installation section of a backlight chassis of the third embodiment.

Now, as shown in FIGS. 6 and 7, in the installation section (the projecting section) 4c of the backlight chassis 4 of the third embodiment, there are formed two different-sized installation holes 4e and 4f. The larger installation hole 4e of the backlight chassis 4 is for inserting therethrough the engagement pin (the engagement piece) 39c of the support member 39 into the installation section (the projecting section) 4c of the backlight chassis 4, and the smaller installation hole 4f of the backlight chassis 4 is for engaging therein the engagement pin (the engagement piece) 39c of the support member 39.

Figure 8:
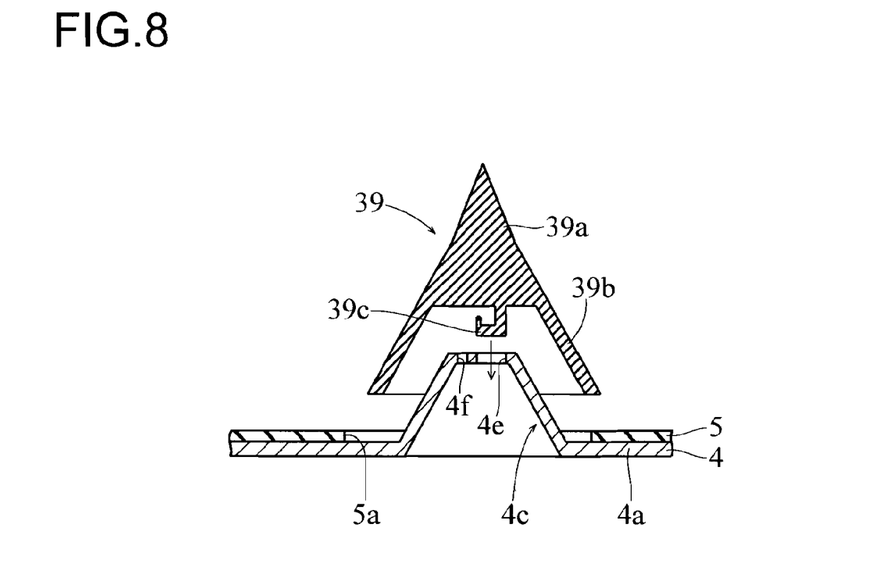
FIG. 8 is a diagram for illustrating an operation performed in installing the support member on the installation section of the backlight chassis of the third embodiment.

And, according to the third embodiment, in installing the support member 39 on the installation section (the projecting section) 4c of the backlight chassis 4, first, as shown in FIG. 8, the engagement pin (the engagement piece) 39c of the support member 39 is inserted into the installation section (the projecting section) 4c of the backlight chassis 4 through the larger installation hole 4e of the backlight chassis 4 while the installation section (the projecting section) 4c of the backlight chassis 4 is being fitted into the cup section 39b of the support member 39. And, by making support member 39 slide to a lateral direction from this state, the engagement pin (the engaging piece) 39c of the support member 39 is engaged in the smaller installation hole 4f of the back light chassis 4. This results in the state shown in FIG. 6.

The other features of the third embodiment are the same as those of the first embodiment described above.

According to the third embodiment, by using the support member 39 structured as described above, the support member 39 can be securely installed on the installation section (the projecting section) 4c of the backlight chassis 4 despite the fact that the structure of the support member 39 is simpler than that of the support member 9 of the first embodiment. This makes it possible to improve the easiness of production and prevent the support member 39 from falling off from the installation section (the projecting section) 4c of the backlight chassis 4.

The other advantages of the third embodiment are similar to those of the first embodiment described above.

Fourth Embodiment

Next, with reference to FIG. 9, a description will be given of the structure of a backlight unit according to a fourth embodiment.

Figure 9:
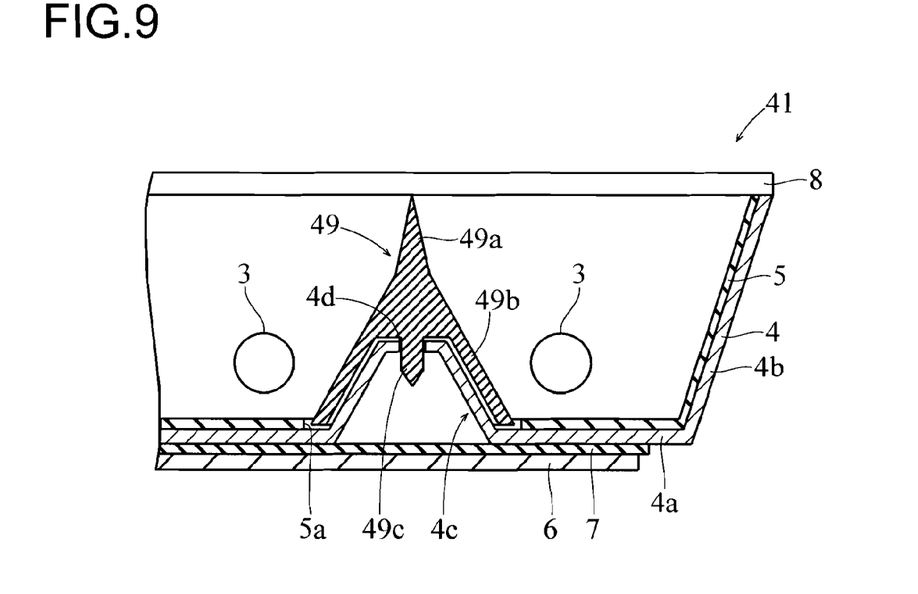
FIG. 9 is a sectional view of a backlight unit according to a fourth embodiment of the present invention (a sectional view showing a vicinity of a support member supporting an optical sheet)

In a backlight unit 41 according to the fourth embodiment, a support member 49 as shown in FIG. 9 is used. The support member 49 of the fourth embodiment is specifically structured such that it includes a circular-cone shaped support prop 49a for supporting the optical sheet 8, a cup section 49b formed in a recessed shape having an opening that is open to the opposite side from the end of the support prop 49a, and an male screw section 49c formed to project into the inside of the cup section 49b, which are integrally formed as a single unit. The support prop 49a and the cup section 49b of the support member 49 of the fourth embodiment are similar to the support prop 9a and the cup section 9b, respectively, of the support member 9 of the first embodiment described above. The fourth embodiment also includes a male screw section 49c of the support member 49, which is a substitution for the engagement pin 9c of the support member 9 of the first embodiment described above. The cup section 49b is an example of the "recessed section" of the present invention, and the male screw section 49c is an example of the "engagement section" of the present invention.

And, according to the fourth embodiment, the support member 49 is installed on the installation section (projecting section) 4c of the backlight chassis 4 by fitting the installation section (projecting section) 4c of the backlight chassis 4 into the cup section 49b of the support member 49 and screwing the male screw section 49c of the support member 49 in the installation hole 4d of the backlight chassis 4.

The other features of the fourth embodiment are the same as those of the first embodiment described above.

According to the fourth embodiment, by using the support member 49 structured as described above, the support member 49 can be securely installed on the installation section (the projecting section) 4c of the backlight chassis 4 despite the fact that the structure of the support member 49 is simpler than that of the support member 9 of the first embodiment. This makes it possible to improve the easiness of production and prevent the support member 49 from falling off from the installation section (the projecting section) 4c of the backlight chassis 4.

The other advantages of the fourth embodiment are similar to those of the first embodiment described above.

Fifth Embodiment

Next, with reference to FIGS. 10 and 11, a description will be given of the structure of a backlight unit according to a fifth embodiment.

Figure 10:
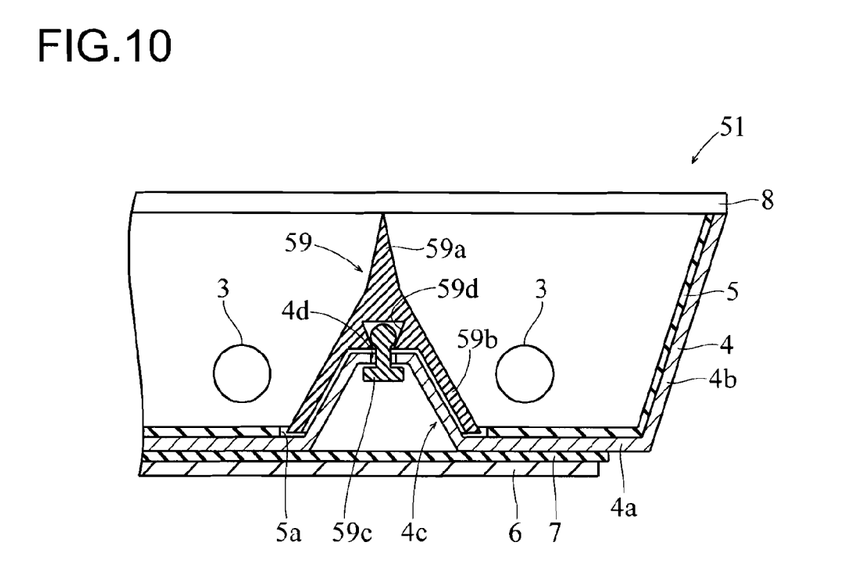
FIG. 10 is a sectional view of a backlight unit according to a fifth embodiment of the present invention (a sectional view showing a vicinity of a support member supporting an optical sheet)

In a backlight unit 51 according to the fifth embodiment, a support member 59 as shown in FIG. 10 is used. The support member 59 of the fifth embodiment is specifically structured such that it is composed of two members that are formed separate. One of the two members include a circular-cone shaped support prop 59a for supporting the optical sheet 8 and a cup section 59b formed in a recessed shape having an opening that is open to the opposite side from the end of the support prop 59a, which are integrally formed as a single unit. The support prop 59a and the cup section 59b included in the one member are similar to the support prop 9a and the cup section 9b, respectively, of the support member 9 of the first embodiment described above. The cup section 59b is an example of the "recessed section" of the present invention.

Furthermore, the one member has a fit section 59d formed in a portion thereof between the support prop 59a and the cup section 59b. The fit section 59d formed in the one member is a hole which is dug starting from the inner-side surface (the top surface) of the cup section 59b toward the support prop 59a.

The other one of the two members is an engagement pin 59c disposed in the cup section 59b of the one member, and corresponds to the engagement pin 9c of the support member 9 of the first embodiment described above. The engagement pin 59c, which is the other member, has a substantially spherical engagement piece formed at an end thereof, and can be fitted into the fit section 59d of the one member. The engagement pin 59c, which is the other member, also has a flange section formed at the other end thereof which is located opposite to its one end. The engagement pin 59c is an example of the "engagement section" of the present invention.

Figure 11:
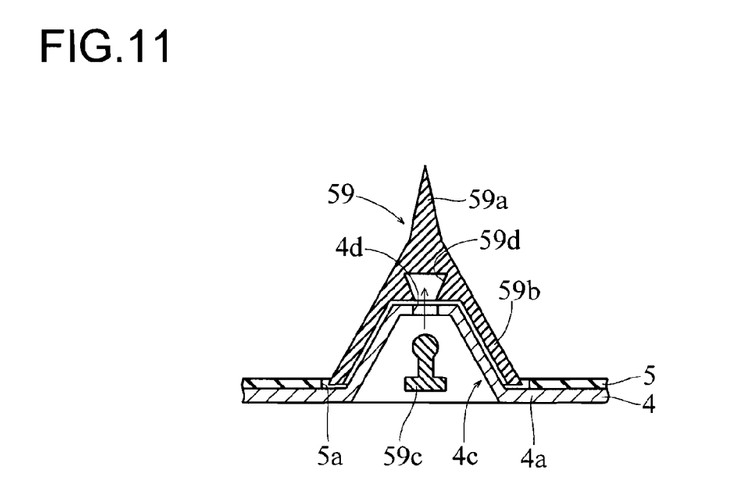
FIG. 11 is a diagram for illustrating an operation performed in installing the support member on the installation section of the backlight chassis of the fifth embodiment.

And, according to the fifth embodiment, in installing the support member 59 on the installation section (the projecting section) 4c of the backlight chassis 4, the installation section (the projecting section) 4c of the backlight chassis 4 is first fitted into the cup section 59b of the support member 59 as shown in FIG. 11. Thereafter, from the inside of the installation section (the projecting section) 4c of the backlight chassis 4, through the installation hole 4d of the backlight chassis 4, the engagement pin (the engagement piece) 59c of the support member 59 is fitted into the fit section 59d. As a result, the engagement pin 59c of the support member 59 is engaged in the installation hole 4d of the backlight chassis 4 to achieve the state shown in FIG. 10.

According to the fifth embodiment, as described above, by using the support member 59 formed of two members that are formed separate, the members being very simply structured, it is possible to further improve the easiness of production.

The other advantages of the fifth embodiment are similar to those of the first embodiment described above.

Sixth Embodiment

Next, with reference to FIG. 12, a description will be given of the structure of a backlight unit according to a sixth embodiment.

Figure 12:
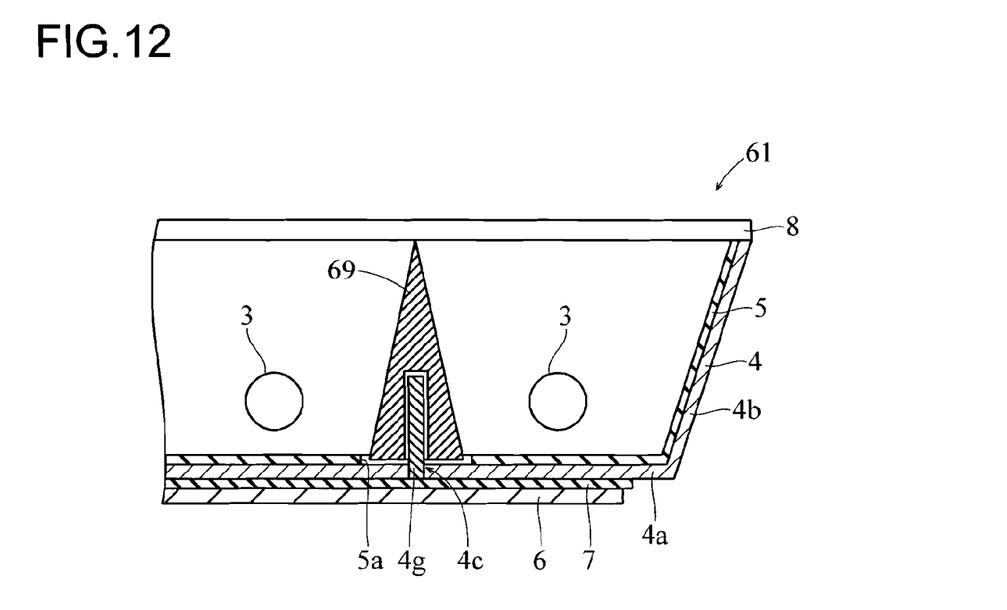
FIG. 12 is a sectional view of a backlight unit according to a sixth embodiment of the present invention (a sectional view showing a vicinity of a support member supporting an optical sheet)

In a backlight unit 61 according to the sixth embodiment, as shown in FIG. 12, the installation section 4c of the backlight chassis 4 is formed of a pin 4g projecting from a predetermined portion of the bottom section 4a of the backlight chassis 4. The pin 4g of the backlight chassis 4 is swaged into a predetermined portion of the bottom section 4a of the backlight chassis 4 such that it projects not rearward but frontward from the bottom section 4a of the backlight chassis 4. Thus, the pin 4g of the backlight chassis 4 does not projects rearward from the bonding surface between the bottom section 4a of the backlight chassis 4 and the insulation sheet 7.

Also, according to the sixth embodiment, a support member 69 formed merely of a cone-shaped support prop is used. And, the pin 4g of the backlight chassis 4 is forced into the support member 69 to achieve a state in which the support member 69 is installed on the installation section 4c of the backlight chassis 4. In this case, the support member 69 does not project rearward from the bonding surface between the bottom section 4a of the backlight chassis 4 and the insulation sheet 7.

The other features of the sixth embodiment are the same as those of the first embodiment described above.

According to the sixth embodiment, as described above, by forming the pin 4g functioning as the installation section 4c so as to project from the predetermined portion of the bottom section 4a of the backlight chassis 4, making the pin 4g project not rearward but frontward from the bottom section 4a of the backlight chassis 4, and forcing the pin 4g functioning as the installation section 4c of the backlight chassis 4 into the support member 69, it is possible to install the support member 69 on the installation section 4c of the backlight chassis 4 so as not to project rearward from the bonding surface between the bottom section 4a of the backlight chassis 4 and the insulation sheet 7. As a result, it is possible to obtain the same advantages as those of the first embodiment; that is, for example, device miniaturization can be achieved.

Incidentally, according to the sixth embodiment, it is possible to make the installation section 4c of the backlight chassis 4 project not rearward but frontward from the bottom section 4a without applying drawing processing to the predetermined portion to be formed as the installation section 4c of the bottom section 4a of the backlight chassis 4. This makes it possible to reduce the space taken up by the installation section 4c of the backlight chassis 4.

The embodiments disclosed herein are to be considered in all respects as illustrative and not restrictive. The scope of the present invention is set out in the appended claims and not in the description of the embodiments hereinabove, and includes any variations and modifications within the sense and scope equivalent to those of the claims.

For example, the above embodiments deal with examples in which the present invention is applied to a backlight unit for a liquid crystal display device, but this is not meant to limit the present invention, and the present invention is applicable to backlight units for display devices other than liquid crystal display devices. Furthermore, the present invention is also applicable to lighting devices other than backlight units.

The invention claimed is:

1. A lighting device, comprising:
a metal chassis having a bottom section and a side section, the chassis housing a fluorescent tube in an area thereof surrounded by the bottom section and the side section;
an optical sheet that is disposed at a front side of the chassis and at least diffuses light from the fluorescent tube;
a support member that supports the optical sheet and is installed on an installation section formed at a predetermined portion of the bottom section of the chassis;
a power supply substrate that is disposed at a rear side of the chassis and supplies power to the fluorescent tube, the rear side of the chassis being opposite to the front side of the chassis; and
an insulation sheet that is disposed between the chassis and the power supply substrate and bonded to the bottom section of the chassis for electrically insulating the chassis and the power supply substrate from each other,
wherein
the installation section of the chassis is disposed in an area that needs to be electrically insulated by the insulation sheet, the installation section projecting not rearward but frontward from the bottom section of the chassis, and
the support member is installed on the installation section of the chassis so as not to project rearward from a bonding surface between the bottom section of the chassis and the insulation sheet.

2. The lighting device of claim 1, wherein the installation section of the chassis is formed of a projecting section obtained by applying drawing processing to the predetermined portion of the bottom section of the chassis.

3. The lighting device of claim 2, wherein the support member has formed therein a recessed section into which the projecting section of the chassis is fitted.

4. The lighting device of claim 2,
wherein
an installation hole is formed in the projecting section of the chassis, and
the support member has formed therein an engagement section that is engaged in the installation hole of the chassis.

5. The lighting device of claim 1,
wherein
the installation section of the chassis is formed with a pin projecting from the predetermined portion of the bottom section of the chassis, and
the support member is installed on the installation section of the chassis by forcing the pin of the chassis into the support member.

6. A display device, comprising:
the lighting device of claim 1; and
a display panel irradiated with light emitted from the lighting device.

7. A display device, comprising:
the lighting device of claim 2; and
a display panel irradiated with light emitted from the lighting device.

8. A display device, comprising:
the lighting device of claim 3; and
a display panel irradiated with light emitted from the lighting device.

9. A display device, comprising:
the lighting device of claim 4; and
a display panel irradiated with light emitted from the lighting device.

10. A display device, comprising:
the lighting device of claim 5; and
a display panel irradiated with light emitted from the lighting device.

* * * * *